W. B. HILL.
AUTOMOBILE LOCK.
APPLICATION FILED NOV. 17, 1917.

1,293,095.

Patented Feb. 4, 1919.

INVENTOR
Wakeman B. Hill

WITNESSES
W. C. Fielding

BY Richard Owen.
ATTORNEY

UNITED STATES PATENT OFFICE.

WAKEMAN B. HILL, OF FAIRFIELD, CONNECTICUT.

AUTOMOBILE-LOCK.

1,293,095.     Specification of Letters Patent.     Patented Feb. 4, 1919.

Application filed November 17, 1917. Serial No. 202,489.

*To all whom it may concern:*

Be it known that I, WAKEMAN B. HILL, citizen of the United States, residing at Fairfield, in the county of Fairfield and State of Connecticut, have invented certain new and useful Improvements in Automobile-Locks, of which the following is a specification.

My invention relates to new and useful improvements in attachments for valves, and has particular reference to valves located in the gasolene service pipe of an automobile between the gasolene tank and the carbureter, affording means whereby the valve may be locked in a closed position to prevent the automobile from being stolen during the absence of the owner.

Another object of my invention is to provide a device of the above mentioned character which is of such simple construction that the same may be manufactured and placed upon the car at a minimum cost, and which is strong, durable and efficient in practice.

Other objects and advantages of this invention will become apparent during the course of the following description.

In the accompanying drawings forming a part of the description and wherein like numerals are employed to designate like parts throughout the same—

Figure 1:
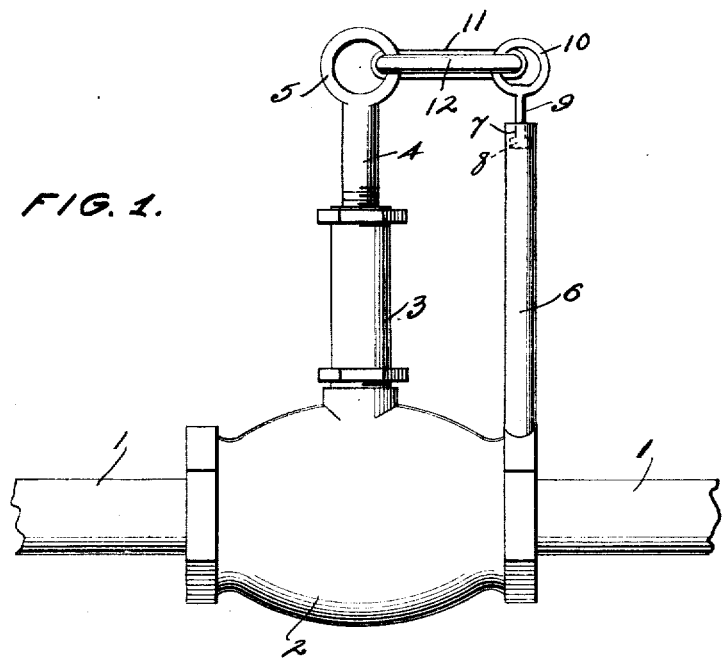
Figure 2:
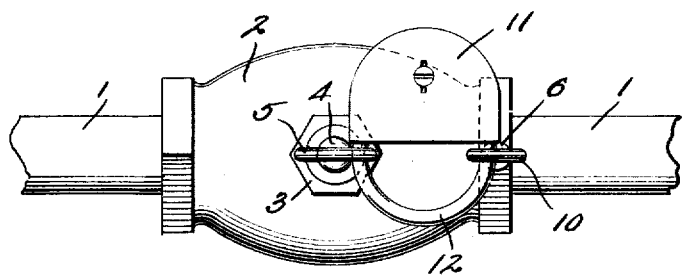

Figure 1 is a side elevation showing the invention when the valve is in a locked position, and Fig. 2 is a top plan view of the same.

In the drawings wherein for the purpose of illustration is shown a preferred embodiment of my invention, the numeral 1 designates a portion of the usual service pipe, in which is installed the valve casing 2, which is of the usual construction and contains the usual shut off valve therein. The sleeve 3 is secured to the top of the valve casing, and adapted to surround the valve stem 4.

This valve stem 4 may be of any suitable length whereby the same may be extended from the valve under the floor of the automobile up through the floor of the machine in order that the loop 5 formed on the upper end thereof, may extend a substantial distance above the floor of the machine. When the loop 5 is in the position shown by the drawings, or is parallel to the service pipe 1, the valve is then in a locked position. It is preferred that the loop 5 be formed from the end of the valve stem 4 by flattening the end thereof, and making an opening therethrough.

The co-acting member of the lock is formed by making an elongated extension 6 upon a portion of the valve casing, adjacent the valve stem. The extensions may be of any shape but is shown in the form of a rod and may also be made of any suitable length and may be extended from the valve casing up through the floor of the automobile. The upper end of this extension 6 is provided with a recess 7 which is enlarged at its bottom to receive the lower upset end 8 of a pin 9. The upper end of this pin 9 is provided with a loop 10 which is integral with the pin 9. By means of the upset end 8 and the recess 7 in the extension 6 a swivel connection is formed for the loop 10. A padlock 11 is adapted to prevent rotation of the valve stem 4 by means of the shackle 12 of the padlock passing through the loops 5 and 10. I do not wish to limit myself to locking the loop by a padlock, as various other methods may be employed.

When it is desired to lock the valve or prevent a further flow of gasolene to the carbureter the valve stem 4 is rotated until the loop 5 extends parallel to the service pipe 1. By means of the swivel connection of the extension 6, the loop 10 is also turned to extend in the same direction, as more clearly shown in the drawings. The shackle 12 of the padlock 11 is then passed through both loops and locked into the body of the padlock. It will be seen that further rotation of the valve stem will be prevented.

It is to be understood that the form of my invention herein shown and described is to be taken as a preferred example of the same and that various changes in the shape, size, and arrangement of parts may be resorted to without departing from the spirit of the invention or the scope of the subjoined claim.

Having described my invention, I claim:

The combination with a service pipe of a valve casing interposed therein and adapted to contain a valve for controlling acid or fluid through said pipe, of a valve stem projecting above said casing and provided on its upper end with a loop for receiving the shackle of a lock, a member carried by said casing and extending in parallel spaced relation to the valve stem said member forming a locking post, and a loop member swiveled to the upper end of said upwardly extending locking member, said loop member being adapted to receive the shackle of the lock inserted through the loop of the valve stem so as to permit said valve stem to be locked against rotary movement.

In testimony whereof I affix my signature in presence of two witnesses.

WAKEMAN B. HILL.

Witnesses:
 ANNIE M. CUSHING,
 ALICE M. C. HILL.

Copies of this patent may be obtained for five cents each, by addressing the "Commissioner of Patents, Washington, D. C."